United States Patent [19]
Preiss et al.

[11] Patent Number: 6,116,365
[45] Date of Patent: Sep. 12, 2000

[54] ARRANGEMENT FOR VENTILATING AN ASSEMBLY ON A VEHICLE

[75] Inventors: Michael Preiss, Vaihingen; Thomas Wiegand, Stuttgart, both of Germany

[73] Assignee: Dr. Ing. h.c.F. Porsche AG, Weissach, Germany

[21] Appl. No.: 09/109,940

[22] Filed: Jul. 2, 1998

[30] Foreign Application Priority Data

Jul. 2, 1997 [DE] Germany .......................... 197 28 265

[51] Int. Cl.⁷ .................................................. B60K 11/08
[52] U.S. Cl. .......................................... 180/68.1; 180/903
[58] Field of Search .................................. 180/68.1, 68.2, 180/68.4, 68.6, 69.1, 903; 296/206, 208, 180.1; 123/417, 41.04

[56] References Cited

U.S. PATENT DOCUMENTS

| | | | |
|---|---|---|---|
| 2,036,560 | 4/1936 | Backus | 180/68.1 |
| 2,221,905 | 11/1940 | Berlin | 123/41.7 |
| 2,358,663 | 9/1944 | Scott-Iversen | 180/68.2 |
| 2,430,759 | 11/1947 | Crise | 180/68.2 |
| 2,683,497 | 7/1954 | Klue | 180/68.1 |
| 3,933,136 | 1/1976 | Burst | 180/68.1 |
| 4,486,046 | 12/1984 | Whitney et al. | |
| 4,558,898 | 12/1985 | Deaver | 296/180.1 |
| 4,646,863 | 3/1987 | Yamada | 180/68.1 |
| 4,810,021 | 3/1989 | Burst | 296/180.1 |
| 4,881,772 | 11/1989 | Feinberg | 296/180.1 |
| 4,951,994 | 8/1990 | Miwa | 296/180.1 |
| 5,678,884 | 10/1997 | Murkett et al. | 180/68.1 |
| 5,724,925 | 3/1998 | Ito | 180/68.1 |

FOREIGN PATENT DOCUMENTS

| | | | |
|---|---|---|---|
| 0 257 341 | 3/1988 | European Pat. Off. | |
| 0 291 650 | 11/1988 | European Pat. Off. | |
| 37 12 048 | 10/1988 | Germany | |
| 37 16 701 | 12/1988 | Germany | |
| 3917108 | 8/1990 | Germany | 180/68.1 |
| 43 19 281 | 12/1994 | Germany | |
| 3630646 | 7/1987 | Japan | 180/68.1 |
| 2-109728 | 4/1990 | Japan | 180/68.1 |
| 831597 | 3/1960 | United Kingdom | 180/68.1 |

*Primary Examiner*—J. J. Swann
*Assistant Examiner*—F. B. Vanaman
*Attorney, Agent, or Firm*—Evenson, McKeown, Edwards & Lenahan, PLLC

[57] ABSTRACT

For increasing the effectiveness of an arrangement for ventilating an assembly on a vehicle, it is provided that, upstream of the assembly to be ventilated, an air guiding element is arranged which, in the cross-sectional view, has a vane-type profile and is set to be relatively steep, and on which an upper air guiding channel and a lower air guiding channel are constructed for the air stream occurring in the driving operation.

6 Claims, 2 Drawing Sheets

ARRANGEMENT FOR VENTILATING AN ASSEMBLY ON A VEHICLE

BACKGROUND AND SUMMARY OF THE INVENTION

The invention relates to an arrangement for ventilating an assembly on a vehicle.

For maintaining limit temperatures on vehicle-side assemblies or similar technical apparatuses, it is generally known to ventilate these apparatuses during, driving through the use of an arrangement interacting with an air stream.

According to European Patent Document EP 0 291 650 A1, an inlet opening is provided on a locally pulled-up section of an underbody covering for the cooling of an assembly situated above the underbody covering, in which case a holding element for the underbody covering arranged adjacent to the inlet opening simultaneously forms a vane-shaped deflecting element for the air stream such that this air stream is guided by means of a lateral deflection onto the assembly to be cooled.

This type of air guiding results in relatively high flow losses. Further, it is not possible to accelerate the air stream on the path to the assembly to be ventilated.

It is an object of the present invention to provide an arrangement for ventilating an assembly on a vehicle such that the effectiveness of the ventilation is significantly improved without any disadvantageous influence on the aerodynamic coefficients (Cw, Cav, CaH).

According to the invention, this object is achieved by an arrangement for ventilating an assembly on a vehicle, characterized in that, upstream of the assembly to be ventilated, an air guiding element is provided which, in the cross-sectional view, has a vane-type profile and is set relatively steeply and on which an upper air guiding channel and a lower air guiding channel are constructed. A distribution of the air stream which, in the driving operation, is aimed at the air guiding element, takes place to both air guiding channels. Additional characteristics which develop the invention advantageously are described herein.

The principal advantages achieved by the present invention are that, as a result of the arrangement of an air guiding element, which viewed in its cross-section, has a vane-type profile and is provided with lateral walls, upstream of the assembly to be ventilated, a significantly improved ventilation of the assembly takes place since, because of the utilization of the two air guiding channels, which are situated above one another and taper toward the component, a larger air volume flow with a simultaneously higher flow rate is guided to the assembly to be ventilated.

As the result of the air guiding element, which viewed in its cross-section is of a vane shape, a relatively low-loss deflection of the air flow occurring while driving. Because of the contraction of the two air guiding channels, a local acceleration takes place of the flow rate of the two partial air streams. The vane-type air guiding element acts virtually as a double ventilating vane.

The air guiding element can be mounted in a simple manner, for example, by snapping it onto a chassis-fixed transverse strut. In the embodiment, the air guiding element is used for the ventilation or cooling of a differential gearing. A round section, which form-lockingly rests on the rear edge of the transverse strut, ensures a reliable seating of the air guiding element on the transverse strut. The fastening of the air guiding element can take place on all adjacent body, chassis or engine parts. The air guiding element may be manufactured of sheet metal or plastic and has a simple construction.

Other objects, advantages and novel features of the present invention will become apparent from the following detailed description of the invention when considered in conjunction with the accompanying drawings.

DETAILED DESCRIPTION OF THE DRAWINGS

Figure 1:
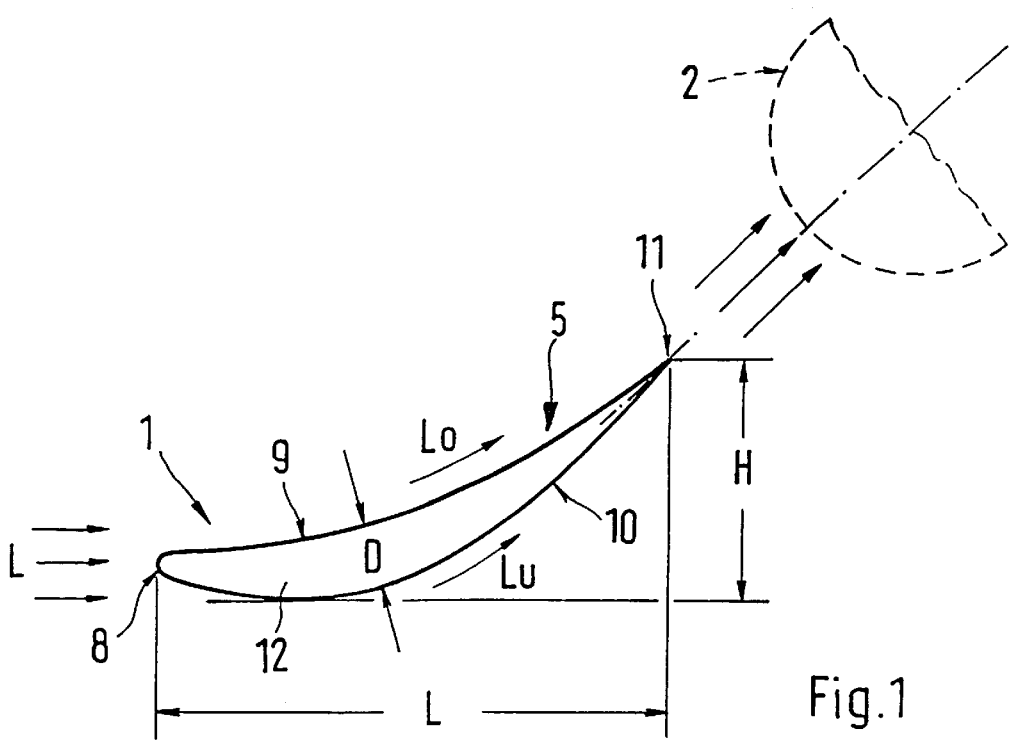
FIG. 1 is a horizontal longitudinal sectional view of the air guiding element according to the present invention and the assembly to be ventilated which is connected behind it.

FIG. 1 illustrates in detail the operating principle of an arrangement for ventilating or cooling an assembly 2 on a vehicle, in which case, as the result of the arrangement, the temperature of the assembly 2 occurring in the driving operation always remains below a defined limit temperature.

According to the invention, an air guiding element 5, which viewed in its cross-section has a vane-type profile and is provided with lateral walls 3a, 3b and 4a, 4b, is arranged upstream of the assembly 2 to be ventilated.

The air guiding element 5 with the vane-type profile is set relatively steeply with respect to the air stream L occurring during the driving operation such that, in the area of the air guiding element 5, this air stream L is divided into two separate partial air flows Lo and Lu. The upper partial air flow Lo interacts with an upper air guiding channel 6 constructed on the top side of the air guiding element 5 and the lower partial air flow Lu interacts with an air guiding channel 7 constructed on the bottom side of the air guiding element 5. Behind the air guiding element 5, the two partial air flows Lo and Lu are guided together again.

Viewed in its cross-section, the air guiding element 5, which has a vane-type profile, has a rounded leading edge 8, from which a top side 9 and a bottom side 10 lead away. In the cross-sectional view, the top side 9 has a concave construction and the bottom side 10 has a convex construction. The top side 9 and the bottom side 10 are guided together on the rear transversely extending end area and form an acutely ending trailing edge 11 of the air guiding element 5. The rounded leading edge 8 of the air guiding element 5 is aligned transversely and preferably at a right angle with respect to the arriving air stream L. The radius on the leading edge 8 must not be below R=3 mm, because otherwise an excessive sensitivity must be expected to a change of the angle of incidence, for example, as the result of installation tolerances or approach flow direction changes. The acutely tapering trailing edge 11 points to the center of the assembly 2 to be ventilated such that the angle bisecting line of the trailing edge 11 points to the center of the assembly 2 to be ventilated (FIG. 1). In the direction of the assembly 2 to be ventilated, both air guiding channels 6, 7 of the air guiding element 5 contract and—in the top view—taper from the rounded leading edge 8 toward the rear in a trapezoidal manner (FIG. 3).

Figure 3:
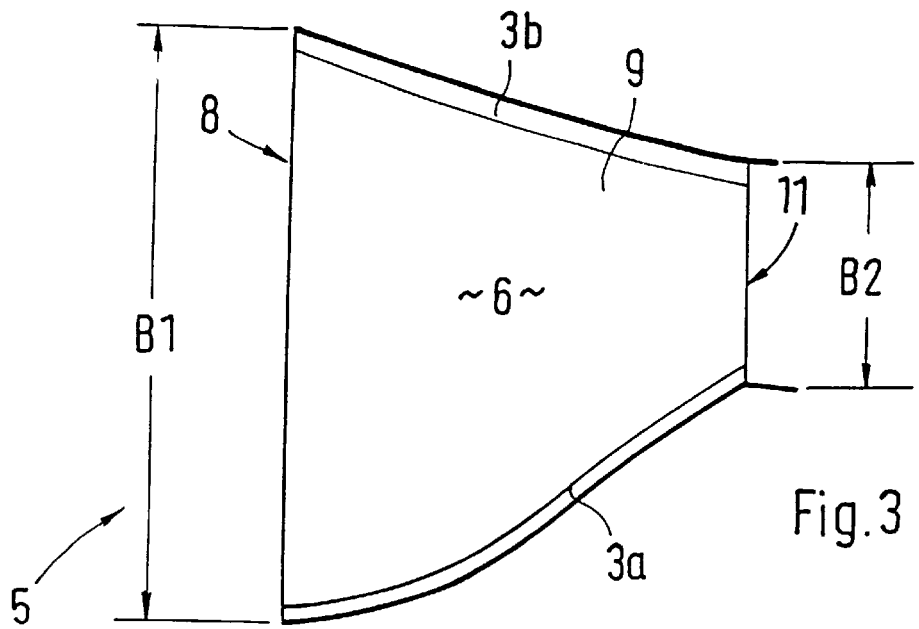
FIG. 3 is a top view of the air guiding element.
Figure 4:
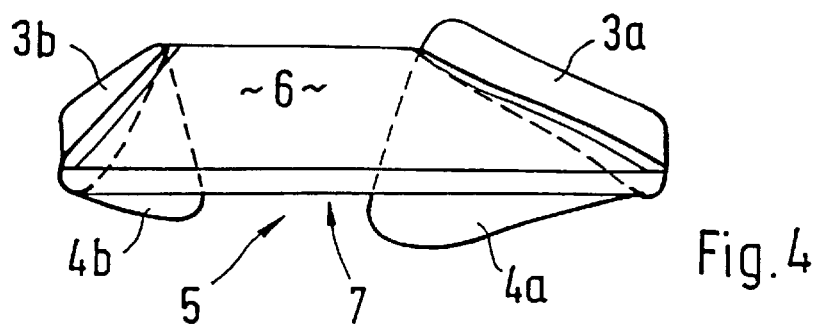
FIG. 4 is a frontal view of the air guiding element.
Figure 5:
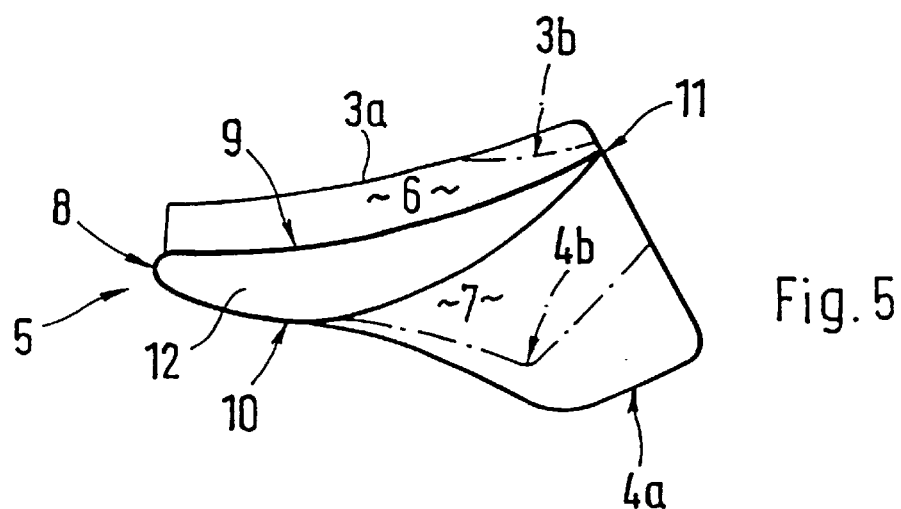
FIG. 5 is a lateral view of the air guiding element.

The course of the upper lateral walls 3a, 3b of the upper air guiding channel 6 is illustrated in FIG. 3. The outer lateral walls 3a, 4a have, at least in areas, a different cut than the inner lateral walls 3b, 4b (see FIG. 5). The upper upright lateral walls 3a, 3b lead away in one piece from the top side 9 of the air guiding element 5, and the lower upright lateral walls 4a, 4b lead away in one piece from the bottom side 10 of the air guiding element 5. Between the top side 9 and the bottom side 10, the hollow air guiding element 5 has an open construction toward both longitudinal sides. The height of the upper lateral walls 3a, 3b should correspond approximately to the maximal thickness D of the vane profile 12. On the convex bottom side 10, the lateral walls 4a, 4b have a construction which is as high as possible with respect to the available space.

The air guiding element 5 which, viewed in the driving direction, is situated in front of, and lower than, the assembly 2 to be ventilated, has approximately the same width $B_2$ on its trailing edge 11 as the adjacent assembly 2 to be ventilated. In the embodiment, the air guiding element 5 is used for ventilating a differential gearing 13 and is arranged in the underbody area 14 of the vehicle. However, it can also be used for other assemblies 2.

While maintaining the necessary free flows, the air guiding element 5 is fastened to adjoining vehicle body, chassis and engine parts.

Figure 2:
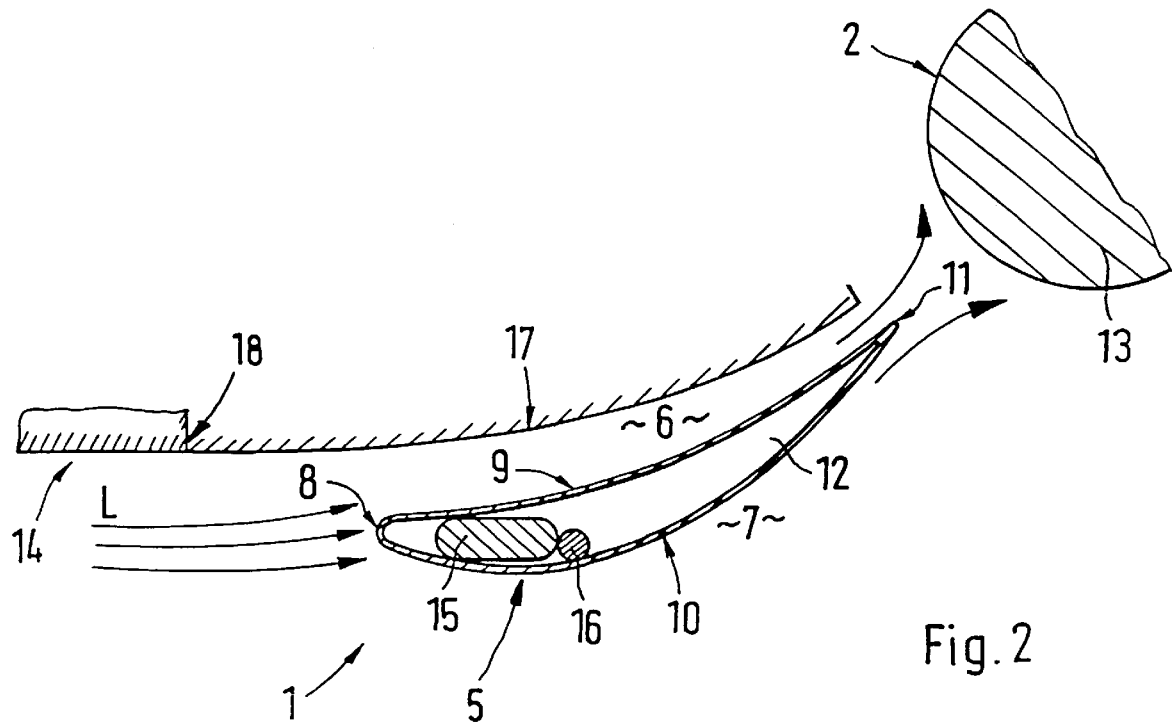
FIG. 2 is another horizontal longitudinal sectional view of the underbody covering of a vehicle with the air guiding element according to the invention, and the assembly to be ventilated.

According to FIG. 2, the air guiding element 5 is held in position by being snapped onto a chassis-fixed transverse strut 15. For placing the air guiding element 5 in the correct position, a round section 16 is fastened on the interior side on the bottom side 10, which round section 16 interacts form-lockingly with the rear edge of the transverse strut 15. In the area of the trailing edge 11, the bottom side 10 and the top side 9 of the air guiding element 5 are locally connected with one another in a manner not shown in detail by means of screws or the like. In the furnished condition, the top side 9 and the bottom side 10 can be unfolded in the area of the trailing edge 11 so that the air guiding element 5 can easily be pushed from the front over the transverse strut 15 and can be connected with it.

According to FIG. 2, the effectiveness of the upper air guiding channel 6 is intensified in that a convexly curved guiding plate 17 is arranged above the air guiding element 5. This guiding plate 17 starts at the rearward underbody covering 18 and extends over the concavely shaped top side 9 of the air guiding element 5. In this case, the air guiding plate 17 and the top side 9 extend such that the cross-section tapers continuously from the front to the rear. Because of the curvature of the top side 9 and of the bottom side 10, the air stream L is deflected with low losses to the assembly 2 to be ventilated. By dividing the flow by way of the top side and the bottom side of the air guiding element 5, a damming point is created on the forward side of the assembly 2 to be cooled, which causes the flowing around the bottom side as well as of the top side of the assembly 2.

Because of the profiling, the trapezoidal tapering and the lateral walls 3a, 3b and 4a, 4b, a continuous increase of the flow rate of the air stream can be achieved along the air guiding element 5. The convection increased in this manner clearly improves the dissipation of heat on the surface of the assembly 2 and thus facilitates the maintenance of the respective required limit temperatures. The air guiding element 6 is made of a dimensionally stable and heat-resistant material, such as sheet metal, plastic or the like. For the manufacturing of the air guiding element 5 of plastic, a divided construction (2 parts) and a screwed connection of the two parts is advantageous. The division can be carried out horizontally as well as vertically or diagonally.

In the embodiment, the leading edge 8 of the air guiding element 5 has a width $B_1$ which is wider than the width $B_2$ of the trailing edge 11. The larger the width $B_1$ is on the leading edge 8, the larger the air mass flow which can be used for the convective cooling of the assembly 2 to be ventilated.

As a function of the length L of the air guiding element 5, as the result of the continuous tapering from the leading edge to the trailing edge (for example, at a ratio of 2:1), a contraction of the flow cross-section can be achieved and thus a clear acceleration of the flow rate.

The necessary deflection of the air stream L is described by means of the parameters: curvature of the median line (profile center line) as well as the thickness distribution of the air guiding element 5. By means of an enlargement of the curvature (in the case of an identical installation position and approach flow direction), in principle, a stronger deflection can be achieved. However, care must be taken that a separation of the flow on the convexly curved bottom side 10 of the air guiding element 5 as the result of an uneven contour or an excessive curvature is avoided.

The lateral walls 3a, 3b and 4a, 4b required for the air guiding should be constructed to be as high as possible in order to achieve a maximal "channeling effect". However, in this case, the distances of parts which are movable with respect to one another (engine, gearing, chassis, body) must be maintained, and in the underbody area 14, the constructively defined ground clearance must be maintained.

In the embodiment, the air guiding element 5 according to the invention is provided in the underbody area 14 of a motor vehicle and is used for ventilating a differential gearing 13. However, it is also conceivable to provide such an air guiding element on rail vehicles for ventilating the brakes or for other purposes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for ventilating an assembly on a vehicle, comprising:

an air guiding element adapted to be arranged upstream of the assembly to be ventilated, said air guiding element having, in a cross-sectional view, a vane-shaped profile having a relatively steep camber;

an upper air guiding channel constructed on an upper surface of the air guiding element and a lower air guiding channel constructed on a lower surface of the air guiding element;

upright lateral walls extending upward from the air guiding element, said upper air guiding channel being formed by a concave top side surface of the air guiding element and the upright lateral walls;

wherein an air stream aimed at the air guiding element is distributed to both the upper and lower air guiding channels;

wherein a height of the lateral walls on the concave top side corresponds approximately to a maximum thickness of the vane shape profile.

2. An arrangement for ventilating an assembly on a vehicle, comprising:

an air guiding element adapted to be arranged upstream of the assembly to be ventilated, said air guiding element having, in a cross-sectional view, a vane-shaped profile having a relatively steep camber;

an upper air guiding channel constructed on an upper surface of the air guiding element and a lower air guiding channel constructed on a lower surface of the air guiding element;

wherein an air stream aimed at the air guiding element is distributed to both the upper and lower air guiding channels;

wherein said air guiding element further comprises a mounting arrangement so as to be holdable on a chassis-fixed transverse strut of the vehicle.

3. The arrangement according to claim 2, wherein said mounting arrangement includes a round section, which is fixedly connected with the air guiding element, and is form-lockingly engageable against a rearward edge of the transverse strut.

4. A vehicle ventilating system, comprising:

an assembly to be ventilated;

an air guiding element arranged upstream of the assembly to be ventilated, said air guiding element having a vane-shaped profile set steeply in a cross-sectional view;

an upper air guiding channel constructed on the air guiding element;

a lower air guiding channel constructed on the air guiding element;

first lateral walls extending upward from said air guiding element, said upper air guiding channel being formed by the concave top side and the first lateral walls; and wherein in a driving operation, an air stream impinging on the air guiding element is distributed to both the upper and lower air guiding channels;

wherein said first lateral walls have a height which corresponds approximately to a maximum thickness of the vane-shaped profile.

5. A vehicle ventilating system, comprising:

an assembly to be ventilated;

an air guiding element arranged upstream of the assembly to be ventilated, said air guiding element having a vane-shaped profile set steeply in a cross-sectional view;

an upper air guiding channel constructed on the air guiding element;

a lower air guiding channel constructed on the air guiding element; and wherein in a driving operation, an air stream impinging on the air guiding element is distributed to both the upper and lower air guiding channels;

further comprising a mounting arrangement for the air guiding element, said mounting arrangement allowing the air guiding element to be mountable on a chassis-fixed transverse strut of the vehicle.

6. The system according to claim 5, wherein the mounting arrangement comprises a round section fixedly connected with the air guiding element, said round section being form-lockingly engageable against a rearward edge of the transverse strut.

* * * * *